O. EKEBERG & E. O. GOORDMAN.
SHAFT COUPLING.
APPLICATION FILED AUG. 22, 1910.

1,009,729.

Patented Nov. 28, 1911.

WITNESSES
Wallace C. Parsons.
Frank B Warren

INVENTORS
Oscar Ekeberg
Elmer O. Goordman
per S. Scholfield
ATTORNEY

UNITED STATES PATENT OFFICE.

OSCAR EKEBERG, OF CONIMICUT, AND ELMER O. GOORDMAN, OF PROVIDENCE, RHODE ISLAND.

SHAFT-COUPLING.

1,009,729.         Specification of Letters Patent.     Patented Nov. 28, 1911.

Application filed August 22, 1910. Serial No. 578,446.

*To all whom it may concern:*

Be it known that we, OSCAR EKEBERG, of Conimicut, in the county of Kent and State of Rhode Island, and ELMER O. GOORDMAN, of Providence, in the State of Rhode Island, have invented a new and useful Improvement in Shaft-Couplings, of which the following is a specification.

The nature of our invention consists in the employment in a shaft coupling, of a split tapering sleeve, and a key, which is held in the shaft and extends through the slot opening of the sleeve, and into the wall of the bore of the body of the coupling as hereinafter set forth.

Figure 1:
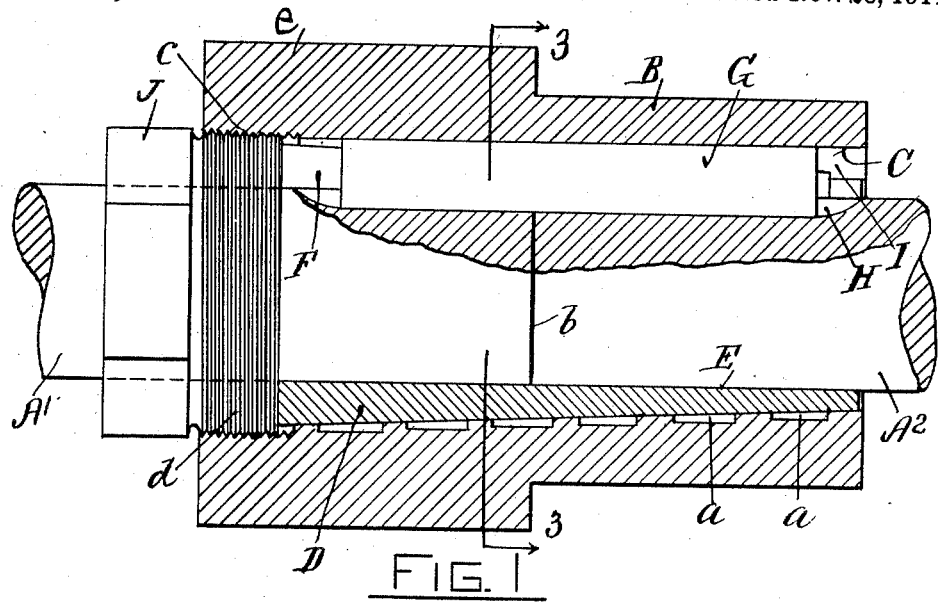
Figure 2:
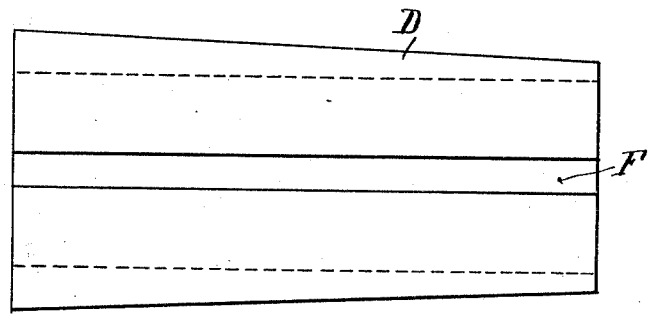
Figure 3:
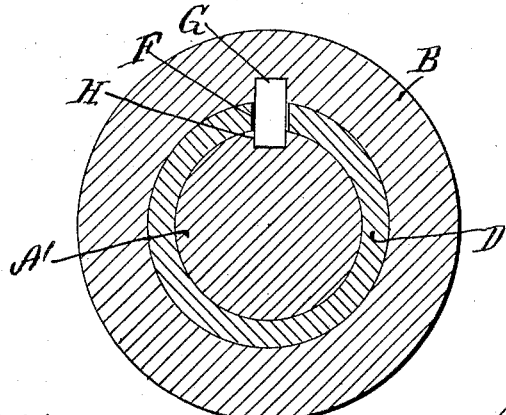

In the accompanying drawing: Figure 1 represents a sectional view of the coupling. Fig. 2 represents a side view of the tapering sleeve. Fig. 3 represents a section taken in the line 3, 3, of Fig. 1.

In the drawing $A^1$ and $A^2$ represent the shafts which are coupled, the said shafts abutting each other at the line $b$.

B represents the body of the coupling, which is provided with a tapering bore C, preferably provided with the annular recesses $a, a$.

D is a tapering sleeve which is provided with a bore E, loosely fitting the shafts and with the open slot F, which is adapted to receive the key G the said key being held in the key way H, cut in the said shaft, and extending through the slot F, into the groove I cut in the tapering bore C of the body portion B of the coupling, as shown in Fig. 3.

The bore C, of the body portion of the coupling is provided with a screw thread $c$ adapted to receive the screw thread $d$ of the sleeve nut J, the said sleeve nut being employed to force the tapering sleeve D forward in the tapering bore C so as to cause the said sleeve to tightly grasp the shafts.

By the use of our improved coupling the shafts and coupling, will always run true, which is a desirable feature where the coupling is to be employed as a pulley, as indicated by the enlarged portion $e$, of the coupling.

We claim as our invention:

In a shaft coupling, the combination of two alined shafts having key seats, a tubular body having a key seat, a key located in said key seat, a tapering sleeve adapted to fit said shafts, and having an open slot to receive said key, and a sleeve threaded into said body for forcing the tapering sleeve forward to tighten the coupling upon the shaft.

OSCAR EKEBERG.
          ELMER O. GOORDMAN.

Witnesses:
    SOCRATES SCHOLFIELD,
    CHAS. W. EDDY.

---

Copies of this patent may be obtained for five cents each, by addressing the "Commissioner of Patents, Washington, D. C."